April 7, 1931.  R. O. HENDRICKSON  1,799,368
TRACTOR CULTIVATOR
Filed Sept. 18, 1929
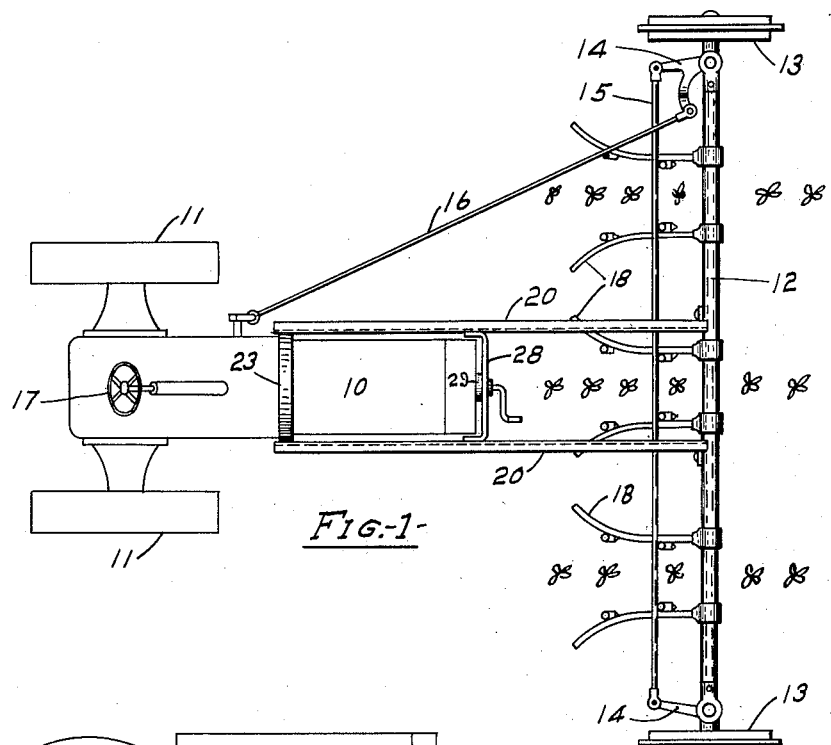
Fig.-1-
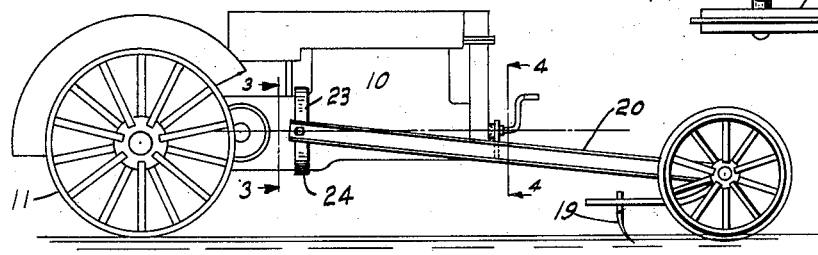
Fig.-2-
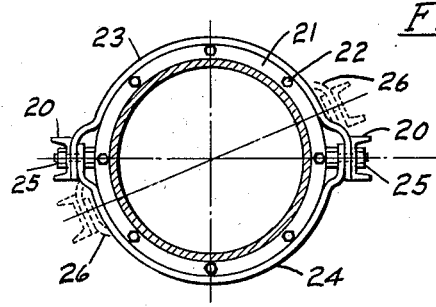
Fig.-3-
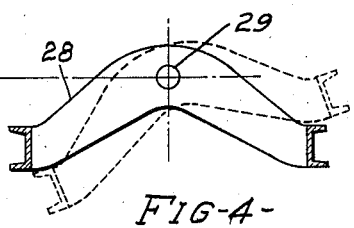
Fig-4-
INVENTOR.
ROBERT O. HENDRICKSON
BY James A. Walsh
ATTORNEY Patented Apr. 7, 1931

1,799,368

UNITED STATES PATENT OFFICE

ROBERT O. HENDRICKSON, OF RACINE, WISCONSIN, ASSIGNOR TO J. I. CASE COMPANY, OF RACINE, WISCONSIN, A CORPORATION

TRACTOR CULTIVATOR

Application filed September 18, 1929. Serial No. 393,377.

My invention relates to tractor cultivators and particularly to an improved cultivator frame adapted to be readily applied to a tractor and which is yieldingly mounted thereon so that it will follow ground irregularities without unduly straining or distorting parts thereof. It has been the practice to mount a cultivator frame rigidly upon a tractor in such manner that these elements form a unitary assemblage, but in the use of this type of tractor-cultivator it is difficult to maintain the cultivator shovels at uniform depth because of ground inequalities, and for the further reason that the rear wheels of such a tractor are indirectly rigidly connected to the cultivator in such manner that when the wheels follow ground irregularities they interfere with the proper action of the shovels. As is commonly known, when one of such wheels sinks into a depression or soft ground, the cultivator shovels arranged diagonally opposite the wheel are caused to be raised with that part of the frame supporting them, as the latter and the tractor are rigidly connected, and consequently the depth of the shovels in relation to the ground is materially lessened and thus at times they become ineffective for the purpose intended, and also, should a rear wheel pass over an obstruction, as a large clod, such situation will cause the shovels arranged diagonally opposite said wheel to enter the ground at considerably greater depth than desired. It is my object, therefore, to provide means whereby the rear wheels of a tractor cultivator may follow the contour of the ground independently of the front wheels without affecting the depth of the shovels, as the frame carrying the latter, being yieldingly mounted on the tractor, will be maintained in normal cultivating position without being disturbed by the irregular movements of the tractor.

In the accompanying drawing, forming part hereof, Figure 1 is a plan view of a tractor-cultivator embodying my invention; Fig. 2, a side elevation; Fig. 3, a transverse sectional view on the dotted line 3—3 in Fig. 2, and Fig. 4 is a detail showing the frame supporting yoke which I employ, as seen when looking in the direction of the arrows 4—4 in Fig. 2.

In said drawing the numeral 10 indicates the body of a tractor, which is supported upon and driven by the rear wheels 11, 11, in a well known manner. To equip a tractor with my improved cultivator attachment I remove the usual front axle, wheels, steering links and associated parts, and install an axle 12 of considerable length, as indicated in Fig. 1, and at the ends of which axle the original wheels 13 are replaced, or other wheels may be substituted as desired. With said axle 12 and front wheels I associate knuckles 14 of a well known character, connected by the rod 15, which are controlled by a link 16 actuated by the steering wheel 17, as usual. At each side of the tractor body, beams 18 are connected to the axle 12, and which support cultivator shovels 19, the beams being positioned apart to straddle plant rows, in a manner well understood.

At each side of the tractor body 10 I connect frame members 20 at their forward ends to the axle 12, and which extend rearwardly along the body, as indicated in Figs. 1 and 2. About the body of the tractor, preferably at about the juncture of the engine and transmission housing, indicated at 21, Fig. 3, and which elements are secured by bolts 22, I mount a ring-like support which may comprise the sections 23, 24, which ring sections and the ends of the frame members 20 are secured together by the bolts 25 or otherwise, the ring as a whole being loosely mounted about the tractor body whereby the relation between the ring and body will be of a swiveling character so that the ring may revolve about the tractor as indicated by the dotted lines 26 in Fig. 3, or the tractor body may have a revolving motion within the ring, according to circumstances.

As the cultivator essemblage is quite in advance of the forward end of the tractor it is necessary to sustain the front portion of the latter, which I accomplish by a yoke-like support 28, pivotally mounted at 29 to the tractor, and at each of its ends the yoke is connected to the longitudinal frame members 20 in any practical manner, and as thus connected to the forward part of the tractor and the ring-like sections 23, 24, as well as the axle 12, it will be readily understood that the cultivator frame is a unitary structure and supports the tractor body at its front end, the yoke 28 and ring 23—25 effectively connecting and bracing the side frame members 20, with the result that the tractor and cultivator are swivelingly and therefore yieldingly connected to each other, resulting in a highly flexible relation between said elements. And it will also be understood that this unitary cultivator frame may be conveniently removed from the tractor when it is desired for other purposes than cultivating and similar work, in which circumstance it may be readily converted to normal condition by removing the cultivator unit and associated parts and substituting the original axle and parts cooperating therewith, and as said cultivator unit is so flexibly connected to the tractor in a manner substantially as disclosed it is obvious that the front wheels of the cultivator unit will follow the contour of the ground independently of the rear wheels due to the pivoting action of the cultivator frame on the center line of the tractor, which will be clearly understood from the drawing and description thereof.

I claim as my invention:—

1. In a tractor-cultivator, a frame comprising an axle, cultivator gangs supported thereby, frame members connected to the axle and extending rearwardly therefrom, means for pivotally connecting the rear ends of the frame members to the tractor, and means intermediate of the axle and the rear ends of the frame members connecting the latter and pivotally connected to the tractor, whereby the tractor and cultivator frame may swivel in relation to each other.

2. In a tractor-cultivator, a cultivator comprising an axle, a frame member conneced at one end to the axle, and means connecting the opposite end of the frame member to the tractor and rotatable about the latter whereby said elements may revolve in relation to each other.

3. In a tractor cultivator, a front axle, longitudinal frame members extending rearwardly therefrom, means connecting the frame members to the tractor whereby said elements may revolve in relation to each other, a yoke connecting said members, and means for pivotally connecting the yoke to a tractor whereby the latter may be sustained by said members.

4. In an implement of the character described, a tractor having rear driving wheels, a cultivator having steering wheels, frame members connected at one end to the cultivator, means revolubly positioned upon the tractor for connecting the opposite ends of said frame members to the tractor, means between the frame members connecting the same, and means pivotally securing the connecting means to a tractor whereby said frame members and tractor may have a revolving motion in relation to each other.

5. In an implement of the character described, a tractor, and an implement comprising a frame, supporting means for the latter, and a ring-like support on said frame and encircling the tractor for swivelingly connecting the frame and tractor.

6. In an implement of the character described, a tractor, and a cultivator comprising a frame, supporting means for the latter, and a two-part circular support on said frame encircling the tractor for swivelingly connecting the frame to the latter.

7. In an implement of the character described, a tractor, and a cultivator comprising a frame, a brace connecting the frame, means for pivotally connecting the brace to the tractor, swiveling means associated with the tractor, and means connecting the frame to said swiveling means whereby the frame and the tractor may each have a revolving motion in relation to the other.

8. In an implement of the character described, a tractor, a cultivator, frame members connected to the cultivator, and a swivel connecting the frame members and supported on the tractor body to rotate thereabout whereby the frame and the tractor may each have a revolving motion in relation to the other.

In testimony whereof I affix my signature.

ROBERT O. HENDRICKSON.